United States Patent
Noguchi

(10) Patent No.: US 10,090,628 B2
(45) Date of Patent: Oct. 2, 2018

(54) CYLINDER, PLASMA APPARATUS, GAS LASER APPARATUS, AND METHOD OF MANUFACTURING CYLINDER

(71) Applicant: KYOCERA Corporation, Kyoto-shi, Kyoto (JP)

(72) Inventor: Yukio Noguchi, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/115,649

(22) PCT Filed: Jan. 30, 2015

(86) PCT No.: PCT/JP2015/052768
§ 371 (c)(1),
(2) Date: Jul. 29, 2016

(87) PCT Pub. No.: WO2015/115624
PCT Pub. Date: Aug. 6, 2015

(65) Prior Publication Data
US 2017/0179669 A1    Jun. 22, 2017

(30) Foreign Application Priority Data
Jan. 30, 2014    (JP) .................................. 2014-015015

(51) Int. Cl.
*H01S 3/03* (2006.01)
*H01S 3/032* (2006.01)

(52) U.S. Cl.
CPC ............ *H01S 3/032* (2013.01); *H01S 3/0305* (2013.01)

(58) Field of Classification Search
CPC ........ H01S 3/032; H01S 3/036; H01S 3/0305; H01S 3/038; H01S 3/41; H01S 3/191
See application file for complete search history.

(56) References Cited

U.S. PATENT DOCUMENTS

| 4,460,529 A * | 7/1984 | Schultze ................... B28B 1/32 264/113 |
| 4,546,482 A * | 10/1985 | Bagaglia ............... H01S 3/0305 372/61 |
| 4,988,479 A * | 1/1991 | Nishikawa ................ B22F 7/08 419/38 |
| 7,582,367 B2 * | 9/2009 | Aihara .................. C04B 35/117 118/723 R |

(Continued)

FOREIGN PATENT DOCUMENTS

| JP | S59-227183 A | 12/1984 |
| JP | S63-258086 A | 10/1988 |

(Continued)

OTHER PUBLICATIONS

International Search Report dated Apr. 28, 2015, issued for International Application No. PCT/JP2015/052768.

*Primary Examiner* — Michael Carter
(74) *Attorney, Agent, or Firm* — Procopio Cory Hargreaves and Savitch LLP

(57) ABSTRACT

There is provided a cylinder including a first cylinder having an inner surface exposed; and a second cylinder joined to an outer surface of the first cylinder, the second cylinder containing alumina as a main component, the first cylinder containing yttrium-containing oxide as a main component.

8 Claims, 4 Drawing Sheets

(56) References Cited

U.S. PATENT DOCUMENTS

| | | | |
|---|---|---|---|
| 2003/0049500 A1* | 3/2003 | Takai | C04B 35/44 |
| | | | 428/702 |
| 2006/0073349 A1 | 4/2006 | Aihara et al. | |
| 2010/0195196 A1* | 8/2010 | Nowak | G03F 7/70025 |
| | | | 359/345 |

FOREIGN PATENT DOCUMENTS

| | | |
|---|---|---|
| JP | H02-159356 A | 6/1990 |
| JP | H02-289306 A | 11/1990 |
| JP | H10-45461 A | 2/1998 |
| JP | 2000-191370 A | 7/2000 |
| JP | 2002-192655 A | 7/2002 |
| JP | 2004-296910 A | 10/2004 |
| JP | 2006-128603 A | 5/2006 |
| JP | 2008-156160 A | 7/2008 |
| JP | 2009-176459 A | 8/2009 |
| JP | 2015-048273 A | 3/2015 |

* cited by examiner

CYLINDER, PLASMA APPARATUS, GAS LASER APPARATUS, AND METHOD OF MANUFACTURING CYLINDER

TECHNICAL FIELD

The present invention relates to a cylinder, a plasma apparatus, a gas laser apparatus and a method of manufacturing the cylinder.

BACKGROUND ART

As apparatuses for oscillating laser to be used for cutting of materials or various measurements, for example, a gas laser apparatus for oscillating a gas laser is widely used. In the gas laser apparatus, a rare gas such as helium-neon (He—Ne) gas or argon (Ar) gas, and, for example, carbon dioxide gas ($CO_2$ gas) or the like are enclosed in a conduit of a gas laser tube, which is a circular-shaped cylinder, and plasma is generated in the conduit. Then, by exciting, for example, carbon dioxide gas molecules ($CO_2$ molecules) by energy of the plasma, light of a specific wavelength is emitted from the carbon dioxide gas molecules ($CO_2$ molecules). For materials used for the gas laser tube, a high airtightness and also a high transparency to a high-frequency electric power for generating plasma are required, and thus for example, materials such as quartz glass are widely used.

Plasma consists of charged particles such as electron or ion, or excited molecules or atoms, which react with each other while intricately moving, and thus is in a state where a physical energy thereof is high and a chemical reactivity is also high. Accordingly, an inner surface of the conduit of the gas laser tube exposed to plasma is likely to be subjected to a physical damage due to energy of the plasma exposed and also a change due to a chemical reaction (hereinafter, the physical damage and the chemical change are collectively referred to as corrosion). Corrosion of the laser tube due to the plasma causes a service life of the gas laser tube to be decreased and thus causes durability of the gas laser apparatus to be deteriorated.

For example, in Patent Literature 1, a configuration for inhibiting corrosion of a laser tube due to plasma is proposed. Specifically, in Patent Literature 1, there is proposed a structure in which a protective film made of metal such as tungsten or molybdenum, or boron carbide is formed on an inner circumferential surface of a laser tube body made of, for example, aluminum nitride. In Patent Literature 1, such a protective film is formed by ion plating, CVD or otherwise.

CITATION LIST

Patent Literature

Patent Literature 1: Japanese Unexamined Patent Publication JP-A 63-258086 (1989)

SUMMARY OF INVENTION

Technical Problem

For example, as in Patent Literature 1, the protective film formed by a general film deposition technique such as ion plating, or CVD, is a relatively strong and dense film. In the case of the protective film, the protective film itself has a high plasma resistance, but there is a problem that crack, flaw and the like thereof is likely to occur due to changes in temperature in accordance with generation of the plasma.

Solution to Problem

There is provided a cylinder including a first cylinder having an inner surface exposed, and a second cylinder joined to an outer surface of the first cylinder, the second cylinder containing alumina as a main component, the first cylinder containing yttrium-containing oxide as a main component.

There is provided a plasma apparatus including the cylinder as described above and electrodes disposed in an inner space of the cylinder to generate plasma.

There is provided a gas laser apparatus including the plasma apparatus as described above, and gas supply means which supplies a laser oscillation gas to the inner space of the plasma apparatus, the gas laser apparatus being configured to generate laser light by generating plasma by the electrodes in a state where the laser oscillation gas is supplied in the inner space.

Further, there is provided a method of manufacturing a cylinder, including a step of preparing a rod-shaped core; a step of forming a first cylinder by thermally spraying yttrium-containing oxide onto an outer surface of the core; a step of forming a second cylinder which is joined to an outer surface of the first cylinder and contains alumina as a main component by thermally spraying alumina onto the outer surface of the first cylinder; and a step of removing the core from an assembly of the first cylinder and the second cylinder and exposing an inner surface of the first cylinder.

Advantageous Effects of Invention

Fracture, crack, flaw and the like are less prone to occur even if plasma is generated in the inside. Also, a cylinder having a high plasma resistance can be manufactured in a short time at a relatively low cost.

DESCRIPTION OF EMBODIMENTS

Figure 1:
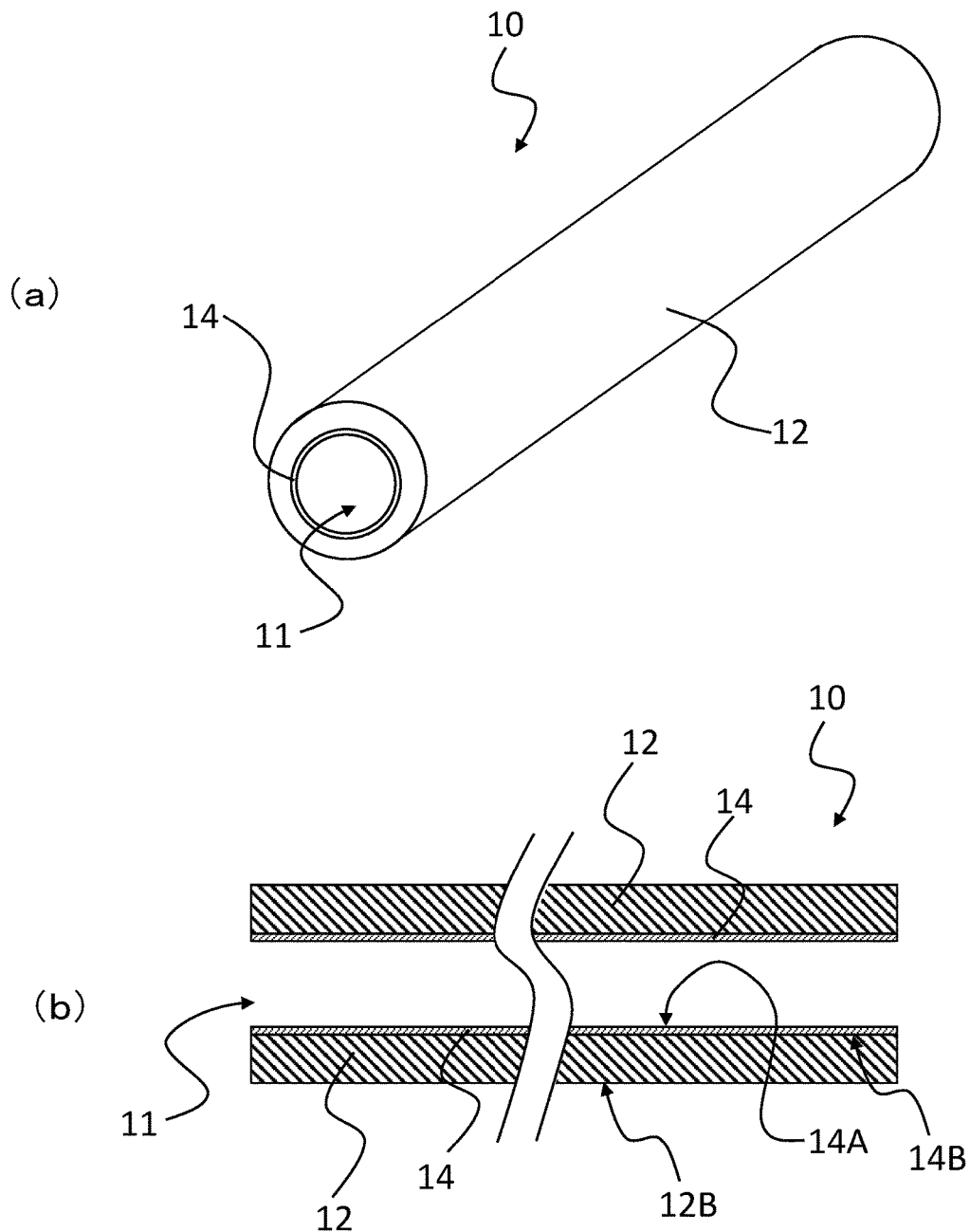
FIG. 1 is a view showing a gas laser tube for a gas laser oscillator as one embodiment of a cylinder, in which FIG. 1(*a*) is a perspective view and FIG. 1(*b*) is a sectional view.

Now, embodiments of the invention will be described in detail with reference to the accompanying drawings. FIG. 1 is a view showing a laser tube 10 as one embodiment of a cylinder. FIG. 1(*a*) is a perspective view of the laser tube 10 and FIG. 1(*b*) is a sectional view.

The laser tube 10 includes a first cylinder 14 having an inner surface 14A exposed and a second cylinder 12 joined to an outer surface 14B of the first cylinder 14, the second cylinder 12 containing alumina as a main component, and the first cylinder 14 contains yttrium-containing oxide as a main component. For example, the first cylinder 14 contains as a main component yttria ($Y_2O_3$), which is yttrium-containing oxide. The phrase "contains as a main component" means that the content thereof is 50% by mass or more. The first cylinder 14 and the second cylinder 12 are preferably configured to contain the main components of 90% by mass or more. Contents of components constituting each member may be obtained by identifying components using an X-ray diffraction (XRD) apparatus, obtaining contents of elements using an X-ray fluorescent (XRF) analyzer or an ICP (Inductively Coupled Plasma) emission spectrophotometer, and then converting the contents of elements into contents of the identified components. For example, the first cylinder 14 may contains various components such as Ti, Al and Si within ranges providing a sufficient plasma resistance, other than yttrium-containing oxide, but preferably contains yttrium-containing oxide of 90% by mass or more because of further improving corrosion resistance to plasma. Also, the second cylinder 12 may contain various components such as zirconia ($ZrO_2$) within ranges providing a sufficient mechanical strength, other than alumina, but preferably contains alumina of 90% by mass or more because of stably forming the second cylinder 12 having a high strength, for example, by thermal spraying as described below.

Meanwhile, the yttrium-containing oxide is not limited to yttria ($Y_2O_3$), but may include complex oxides, which contain yttrium and other elements such as aluminum (Al) such as yttrium aluminum garnet (YAG:$Y_3Al_5O_{12}$:). Also, the yttrium-containing oxide may include complex oxides of yttrium and aluminum such as YAM ($2Y_2O_3/Al_2O_3$) and YAP ($Y_2O_3/Al_2O_3$). These oxides may be simple substances or a plurality of kinds of oxides mixed. These yttrium-containing oxides have a high corrosion resistance to plasma.

The laser tube 10 according to the present embodiment is a cylindrical member having a conduit 11 surrounded by the inner surface of the first cylinder 14 and is used to emit light of a specific wavelength by enclosing a rare gas such as helium-neon (He—Ne) gas or argon (Ar) gas, and, for example, carbon dioxide gas ($CO_2$ gas) in the conduit 11 and then generating plasma of the rare gas in the conduit to excite carbon dioxide gas molecules ($CO_2$ molecules).

Yttrium-containing oxide has a high corrosion resistance to plasma, and alumina has a high mechanical strength and a high thermal conductivity. Accordingly, the laser tube 10 in which the first cylinder 14 contains yttrium-containing oxide as the main component and the second cylinder 12 contains alumina as the main component, has a high corrosion resistance to plasma, a high mechanical strength and a high heat dissipation property.

Figure 2:
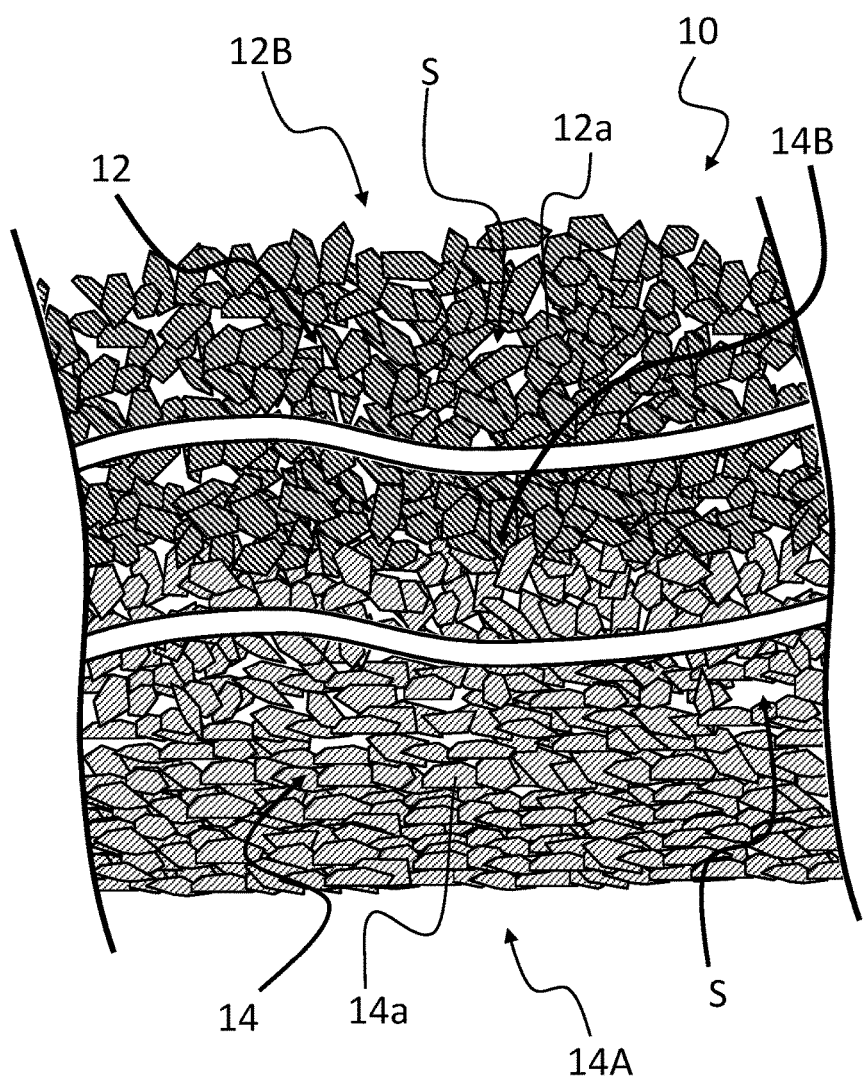
FIG. 2 is an enlarged sectional view of a part of the laser tube shown in FIG. 1.

The first cylinder 14 is formed by thermal spraying and the second cylinder 12 is also formed by thermal spraying. By forming the first cylinder 14 and the second cylinder 12 by thermal spraying, the first cylinder 14 and the second cylinder 12 are inhibited from being deteriorated due to an elevated temperature thereof. Also, by forming the first cylinder 14 and the second cylinder 12 by thermal spraying, the first cylinder 14 and the second cylinder 12 are strongly joined to each other with a relatively high strength. FIG. 2 is an enlarged view showing a part of the laser tube 10. Thermal spraying is a process in which a melted material is sprayed as a micro-particle shape from a nozzle of a thermal spraying apparatus onto a surface of a film-deposited object and then is solidified and deposited thereon. During a course where a thermally-sprayed film gradually thickens over time (micro-particles 12a and 14a are gradually deposited), a surface state, temperature and the like of the thermally-sprayed film are also changed and orientation, density and the like of the micro-particles 12a and 14a are likewise changed. Along with such changes, gaps S are created between flat micro-particles 12a and 14a solidified and deposited. Accordingly, the first cylinder 14 and the second cylinder 12 formed by thermal spraying become a state where relatively many large gaps S are formed between micro-particles 14a and between micro-particles 12a, respectively, as compared with a dense and high-density film formed by ion plating or CVD.

Accordingly, for example, even in a case where rare gas plasma is generated in the conduit 11 and the first cylinder 11 is heated so that each micro-particle 14a expands and pushes each other, room is provided for allowing each micro-particle 14a to expand and move by the gaps S. Therefore, even if the rare gas plasma is generated in the conduit 11 so that the first cylinder 14 is heated, deterioration of the first cylinder 14 due to a stress caused by thermal expansion is small because an internal stress due to thermal expansion of each micro-particle 14a is relieved. The second cylinder 12 is likewise a thermal-splayed film, and thus even if the second cylinder 12 is heated as the rare gas plasma is generated in the conduit 11 and the first cylinder 14 is heated, an internal stress in the second cylinder 12 due to thermal expansion of each micro-particle 12a is reduced and thus deterioration of the second cylinder 12 due to a stress caused by thermal expansion is small. Further, a stress due to a difference in thermal expansion coefficient between the first cylinder 14 and the second cylinder 12 is likewise relieved. In this way, the laser tube 10 is inhibited from being deteriorated due to thermal expansion in accordance with generation of plasma.

Further, in the case where the first cylinder 14 is formed by thermal spraying and the second cylinder 12 is formed by thermal spraying, i.e. where the second cylinder 12 is formed on the outer surface 14B of the first cylinder 14 which has been formed by thermal spraying, by thermal spraying, micro-particles 12a of alumina constituting the second cylinder 12 collide with micro-particles 14a of yttria constituting the first cylinder 14 at a boundary between the first cylinder 14 and the second cylinder 12. Thus, the particles are joined to each other and grow, and also the micro-particles 12a of the second cylinder 12 enter portions of gaps S which exist between the micro-particles 14a. Accordingly, at the boundary between the first cylinder 14 and the second cylinder 12, micro-particles 14a and micro-particles 12a are in a mixed state, so that the first cylinder 14 and the second cylinder 12 are coupled to be meshed with each other. As a result, the first cylinder 14 and the second cylinder 12 are joined to each other with a relatively high strength.

A thickness of the first cylinder 14 is 0.5 mm or more and 1 mm or less and a thickness of the second cylinder 12 is 2.6 mm or more and 3.6 mm or less, and thus the thickness of the second cylinder 12 is larger than the thickness of the first cylinder 12. Alumina constituting the second cylinder 12 has a relatively high mechanical strength and also a relatively high thermal conductivity. Because the laser tube 10 have the second cylinder 12 having such a relatively large thickness, the entire laser tube 10 has a relatively high mechanical strength and also a relatively high heat dissipation property.

Further, an arithmetic average roughness (Ra) of the inner surface of the first cylinder 14 is about 0.4 to 1.6 µm, and an arithmetic average roughness (Ra) of an outer surface 12B of the second cylinder 12 is about 1.6 to 3.2 µm, and thus the arithmetic averaged roughness (Ra) of the inner surface of the first cylinder 14 is smaller than the arithmetic average roughness (Ra) of the outer surface 12B of the second cylinder 12. In the case of the laser tube 10 in which the inner circumferential surface 14A exposed to plasma has such a relatively small surface roughness, a surface area of the inner circumferential surface 14A, i.e., an area through which heat of the plasma is introduced is relatively small, and thus a temperature of the first cylinder 14 is less prone to be increased. On the other hand, because the arithmetic average roughness of the outer surface 12B of the second cylinder 12 is relatively large, a surface area of the outer surface 12B of the second cylinder 12 is relatively large, and thus heat energy by the plasma generated in the conduit 11 is effectively dissipated through the outer circumferential surface 12B, thereby suppressing an increase in temperature of the first cylinder 14 and the second cylinder 12.

Further, in a case where the first cylinder 14 is formed by thermal spraying and also the arithmetic average roughness (Ra) of the inner surface of the first cylinder 14 is small, few micro-particles 14A on the inner circumferential surface 14A partially protrude therefrom, thereby suppressing falling-out of micro-particles 14a from the inner circumferential surface 14A. Also, even if the plasma is repetitively generated, cleanliness of the inside of the gas laser tube 10 can be kept high.

Further, an open pore area ratio of the inner surface 14A of the first cylinder 14 is smaller than an open pore area ratio of the outer surface 12B of the second cylinder 12. The open pore area ratio means a ratio of a total area of open pores, which except micro-cracks, can be identified within an observation field when a surface is observed, to the entire area of the observation field. For the open pore area ratio, an image data is acquired by observing a surface to be measured at 100× magnification, for example, using an optical microscope and photographing a region having an area of 0.15 mm$^2$ (the transversal length is 1000 μm and the longitudinal length is 150 μm) using a CCD camera attached to the optical microscope. Then, a total area of open pores can be calculated by performing particle analysis in an image analysis software "A-Zo Kun" (registered trademark, produced by Asahi Kasei Engineering Corporation) using the acquired image data. Meanwhile, as setting conditions for the particle analysis, for example, brightness is set to dark, a binarization method is set to manual, a small figure removal area is set to 1 μm$^2$, and a threshold value, which is an indicator representing a contrast of the image, is set to be 0.3 times or less a peak value of a histogram representing a brightness of each point (each pixel) in the image.

In a case where the open pore area ratio of the inner surface 14A of the first cylinder 14 is smaller than the open pore area ratio of the outer surface 12B of the second cylinder 12, unevenness of the inner surface 14A is smaller as compared with the outer surface 12B and the surface area of the inner surface 14A of the first cylinder 14 is smaller as compared with the surface area of the outer surface 12B of the second cylinder 12. Therefore, heat energy can be suppressed from being introduced to the first cylinder 14 through the inner surface 14A, and at the same time, dissipation of the heat energy from the outer surface 12B of the second cylinder 12 can be enhanced, thereby suppressing an increase in temperature of the first cylinder 14 and the second cylinder 12. In addition, by setting the open pore area ratio of the inner surface 14A of the first cylinder 14 to be relatively small, falling-out of micro-particles 14a from open pores of the inner surface 14A can be suppressed, and thus even if the plasma is repetitively generated, cleanliness of the inside of the gas laser tube 10 can be kept high. For example, the open pore area ratio of the inner surface 14A of the first cylinder 14 is 0.25% or more and 0.75% or less, and the open pore area ratio of the outer surface 12B of the second cylinder 12 is 0.85% or more and 1.5% or less. A difference between the open pore area ratio of the inner surface 14A and the open pore area ratio of the outer surface 12B of the second cylinder 12 is preferably set to be 0.1% or more.

Figure 3:
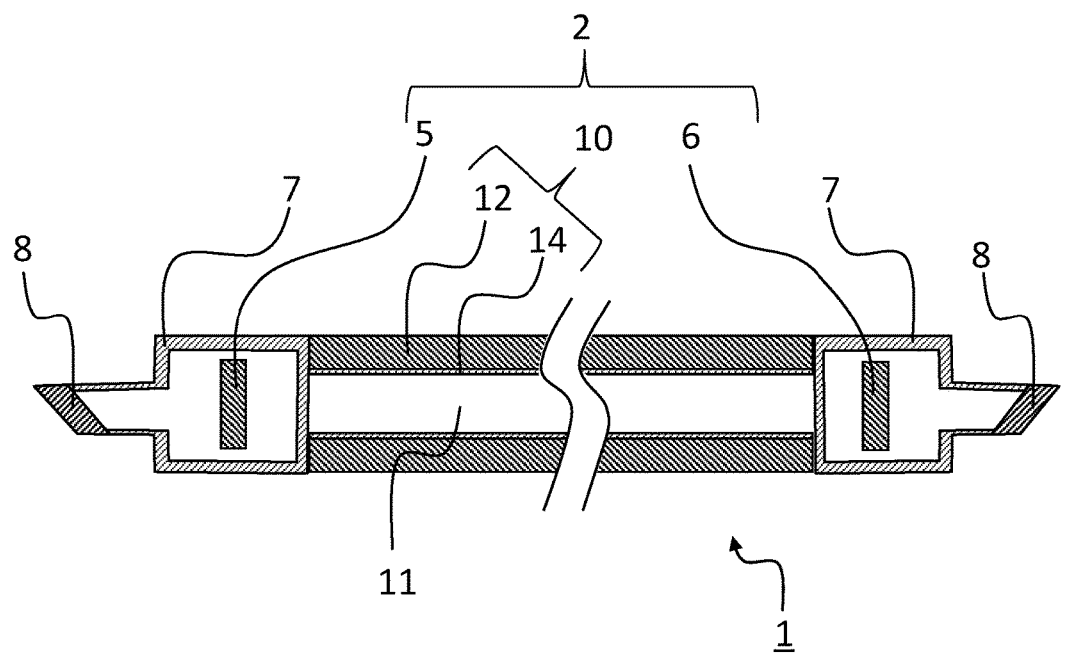
FIG. 3 is a sectional view of one embodiment of a gas laser apparatus having the laser tube shown in FIGS. 1 and 2.

FIG. 3 is a sectional view of one embodiment of a plasma apparatus and one embodiment of a gas laser apparatus. The plasma apparatus 2 includes the laser tube (cylinder) 10, and electrodes (cathode 5 and anode 6) for applying an electric voltage to the conduit (inner space) 11 to which the inner surface 14A of the laser tube 10 is exposed, and thus generating plasma in the conduit 11. The gas laser apparatus 1 shown in FIG. 3 includes the plasma apparatus 2 and gas supply means (not shown) for supplying a laser oscillation gas to the conduit (inner space) 11 of the plasma apparatus 2, and is configured to generate laser light by generating plasma by the electrodes (cathode 5 and anode 6) in a state where the laser oscillation gas is supplied in the conduit 11.

More specifically, the gas laser apparatus 1 includes the laser tube 10, envelopers 7 arranged on both ends of the laser tube 10, reflecting mirrors 8 arranged inside the envelopers 7, and electrodes (cathode 5 and anode 6). The laser tube 10 is configured so that the inside thereof is connected to a vacuum pump and the gas supply means which are not shown, and also a gas flow rate to the inside of the laser tube 10 or a degree of vacuum thereof can be adjusted. In the gas laser apparatus 1, an electric voltage is applied between the cathode 5 and the anode 6 in a state where a rare gas such as argon, and a carbon dioxide gas are introduced into the laser tube 10 and at the same time a degree of vacuum thereof is enhanced, so that plasma of the argon gas is generated to excite the carbon dioxide gas. Then, by causing light of a specific wavelength generated due to the excitation to travel forth and back between the reflecting mirrors 8, the light is amplified and thus an amplified laser light can be oscillated.

In the case where the laser tube 10 is employed in the gas laser apparatus 1 as described above, even when the rare gas plasma is generated in the conduit 11, corrosion of the laser tube 10 due to the plasma is small because the first cylinder 14 has a high plasma resistance.

Because a temperature of plasma in the gas laser apparatus is increased up to a few hundreds ° C., the laser tube 10 repetitively undergoes an increase or decrease in temperature over a range from a room temperature to a few hundreds ° C. For example, in a case where, as in a conventional laser tube, a dense protective film (plasma resistant film) is formed on an inner circumferential surface of a laser tube body made of ceramic material such as aluminum nitride by ion plating, CVD or otherwise, an internal stress caused by thermal expansion of the protective film itself during increase and decrease in temperature due to the plasma or a stress caused by a difference in thermal expansion coefficient between the laser tube body and the protective film is generated in the protective film. Thus, strain is gradually locally accumulated in the dense protective film due to such stresses, and thus crack, flaw and the like of the protective film are likely to occur at a relatively earlier stage (stage, at which the number of changes in temperature is still small). The laser tube 10 of the present embodiment has also a high durability against changes in temperature, and thus fracture, crack, flaw and the like of the laser tube 10 is less prone to occur even if oscillation of laser is repeated, i.e., even if changes in temperature due to generation of plasma are repeated, thereby allowing the gas laser apparatus 1 to be repetitively used for a relatively long time.

Next, with respect to one example of a method of manufacturing this cylinder, manufacturing the laser tube 10 as described above will be described as one embodiment thereof. FIGS. 4(a) to 4(d) are schematic sectional views explaining a method of manufacturing the laser tube 10.

The manufacturing method of the present embodiment includes a step of preparing a rod-shaped core 30; a step of forming the first cylinder 14 by thermally spraying yttrium-containing oxide onto an outer surface of the core 30; a step of forming the second cylinder 12 which is joined to the outer surface 14B of the first cylinder 14 and contains alumina as the main component by thermally spraying alumina onto the outer surface 14B of the first cylinder 14; and a step of removing the core 30 from an assembly of the first cylinder 14 and the second cylinder 12 and exposing the inner surface 14A of the first cylinder 14.

Figure 4:
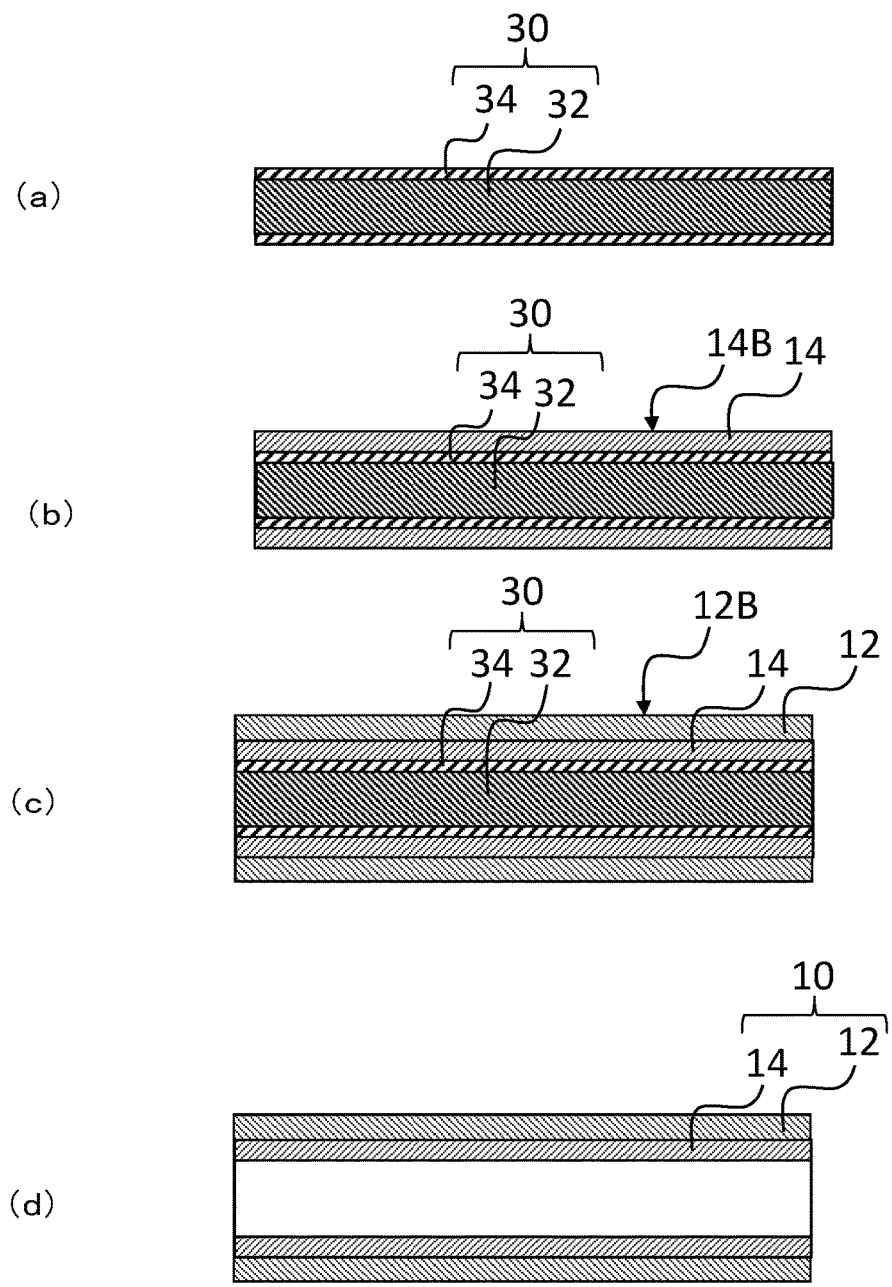
FIGS. 4(*a*) to (*d*) are sectional views showing one embodiment of a method of manufacturing a cylinder.

First, the rod-shaped core 30 is prepared (FIG. 4(a)). The core 30 of the present embodiment is constituted of a rod-shaped shaft body 32 and a release agent layer 34 formed on an outer surface of the shaft body 32. The release agent layer 34 has a property in which the layer is dissolved in a specific solvent such as water or organic solvent. For the shaft body 32, for example, metal such as stainless steel or aluminum, resin or the like may be used. For the release agent layer 34, for example, boron nitride powder, carbon powder or the like may be used. The outer surface of the shaft body 32 has an arithmetic average roughness adjusted by polishing or otherwise. For example, an arithmetic average roughness of a surface of the release agent 34 (i.e., the outer surface of the core 30) has a relatively small arithmetic average roughness of about 0.2 to 0.8 μm.

Subsequently, the first cylinder 14 is formed by thermally spraying yttrium-containing oxide on the outer surface of the core 30 (FIG. 4(b)). As a thermal spraying technique, various thermal spraying techniques such as low pressure plasma spraying, atmospheric pressure plasma spraying, flame spraying, arc spraying or laser spraying, may be employed, but atmospheric pressure plasma spraying technique is preferably employed because the technique can use a particularly high-temperature heat source, can be applied to materials having a high melting point and also can form a corrosion resistant layer at a relatively low cost as compared with other thermal spraying techniques.

First, powder of yttria ($Y_2O_3$) (yttria-containing oxide) is melted in a thermal spraying apparatus. As yttria powder, a material having a primary raw material averaged particle diameter of 0.5 to 10 μm is used. In the present embodiment, oxide power of at least one of Ti, Al and Si having a particle diameter of about 1 μm is added at a proportion of about 1% by mass or less to the yttria power. When such an additive is contained, the yttria power is prone to be relatively strongly attached to the surface of the release agent 34, so that the first cylinder 14 can be inhibited from peeling off from the core 30 during manufacturing. More specifically, a primary raw material in which oxide powder of at least one of Ti, Al and Si is added in a range of 0.001 to 3% by mass to the yttria powder, is granulated using a granulation technique such as general rolling granulation, thereby obtaining a thermal spraying material having an averaged particle diameter of 10 to 50 μm. The thermal spraying material is charged into an atmospheric pressure plasma spraying apparatus through a powder charging port thereof.

In the atmospheric pressure plasma spraying apparatus, the charged thermal spraying material is heated and melted at a temperature of a few thousands to a few ten thousands degrees by plasma as a heat source. Upon spraying, a mixed gas of argon and hydrogen is used as gas for injecting the melted material. At the same time as the injection of the gas, the melted thermal spraying material is injected toward the outer surface of the core 30. In this case, adjustment of power of the apparatus is performed in such a manner that argon gas is used as a main and hydrogen gas is added thereto. At this time, the power is preferably around 40 kW and a distance from the core 30 to an injection port of the spraying apparatus is set to around 100 mm. Also, in order to form a uniform thermally-sprayed film on a surface of a base material, the thermal spraying port is vertically and horizontally moved while keeping a constant distance to the base material therefrom. For example, the thermal spraying port is moved at a moving speed of around 30 m/min in a horizontal direction and is moved at intervals of 5 mm in a vertical direction, thereby gradually forming the thermally-sprayed film (first cylinder 14) on the entire surface of the base material. The formed thermally-sprayed film (first cylinder 14) is prone to reflect the primary raw material average particle diameter of the used thermal spraying material, and thus an average grain diameter thereof becomes 0.5 to 10 μm.

As described above, the outer surface of the core 30 has a relatively small arithmetic average roughness of about 0.2 to 0.8 μm and the inner circumferential surface 14A of the first cylinder 14 which is directly formed on the outer surface of the core 30, includes micro-particles 14a (see FIG. 2) densely arranged in accordance with the surface shape of the core 30, so that an arithmetic average roughness thereof can have a relatively small value of about 0.4 to 1.6 μm. In this way, by setting the surface roughness of the inner circumferential surface 14A to be relatively low, falling-out of micro-particles 14a from the inner circumferential surface 14A can be suppressed and thus cleanliness of the inside of the gas laser tube 10 can be kept high.

Also, after the thermally-sprayed film is formed, heat treatment is performed so that the first cylinder 14 formed can be densified or the inner surface 14A of the first cylinder 14 can be further smoothed. The heat treatment may be performed in an atmospheric furnace so long as a temperature condition is satisfied, and for example, may be performed at a temperature of about 500 to 1400° C. Due to the heat treatment, contact interfaces between micro-particles 14a of the first cylinder 14 formed by thermal spraying are activated to promote particle growth, so that the first cylinder 14 can be densified and also gaps S between micro-particles 14a exposed on the inner circumferential surface 14A of the first cylinder 14 can be reduced to decrease the arithmetic average roughness. In this way, by reducing the surface roughness of the inner circumferential surface 14A, falling-out of micro-particles 14a from the inner circumferential surface 14A can be further suppressed and thus cleanliness of the inside of the gas laser tube 10 can be kept higher.

Meanwhile, the thermal spraying technique, thermal spraying conditions, whether or not the heat treatment is employed, conditions of the heat treatment and the like are not particularly limited, and accordingly, the first cylinder 14 having desired properties may be formed by adjusting thermal spraying conditions or heat treatment conditions in accordance with properties required to the first cylinder 14 such as durability against changes in temperature, and an effect of suppressing falling-out of micro-particles 14a.

Subsequently, the second cylinder 12 having a cylindrical shape is formed by thermally spraying alumina on the outer surface 14B of the first cylinder 14 (FIG. 4(c)). Similarly to thermal spraying of yttria, thermal spraying of alumina also starts from melting powder of alumina in a thermal spraying apparatus. As alumina powder, for example, a material having a primary raw material average particle diameter of 0.4 to 10 μm is used. The alumina powder may contain impurities such as metal elements, but preferably the one having a purity (content of alumina) of about 90% by mass or more is used. Thermal spraying conditions of alumina may be performed in accordance with the same technique and conditions as those of the first cylinder 14 as described above and also may be performed in accordance with various conditions adjusted in accordance with required properties of the first cylinder 14. As described above, in a case where the second cylinder 12 is formed by thermal spraying, micro-particles 12a of alumina constituting the second cylinder 12 collide with micro-particles 14a of yttria constituting the first cylinder 14 at a boundary between the first cylinder 14 and the second cylinder 12. Thus the particles are joined to each other and grow, and also the micro-particles 12a of the second cylinder 12 enter portions of gaps S which exist between micro-particles 14a. Accordingly, the first cylinder 14 and the second cylinder 12 are coupled to be meshed with each other, so that the first cylinder 14 and the second cylinder 12 are joined to each other with a relatively high strength. Also, the outer surface 12B of the second cylinder 12 formed by depositing micro-particles 12a by thermal spraying is easily made to have a larger surface roughness and a larger open pore area ratio, as compared with the inner surface 14A of the first cylinder 14 having micro-particles 14a (see FIG. 2) densely arranged in accordance with the surface of the core 30.

After the second cylinder 12 is formed, the core 30 is removed from an assembly of the first cylinder 14 and the second cylinder 12, so that the inner surface 14A of the second cylinder 14 is exposed (FIG. 4(d)). Because the outer surface portion of the core 30 has the release agent 34 arranged therein, the core 30 can be easily removed by dissolving the release agent 34 with a specific solvent to cause a clearance to be created between the shaft body 32 and the first cylinder 14 and then removing the shaft body 32 therefrom. Through the process as described above, the laser tube 10 for the gas laser oscillation apparatus can be manufactured. According to the manufacturing method of the present embodiment, a plasma resistant member having a high plasma resistance and also a high durability against changes in temperature can be manufactured in a short time at a relatively low cost without using a large scale film deposition apparatus such as a sputter apparatus.

Meanwhile, although in the present embodiment, the core 30 is constituted of the shaft body 32 and the release agent 34, for example, the entire core 30 may be constructed of a material which can be dissolved in a specific solvent such as acetone, and after the first cylinder 14 and the second cylinder 12 are formed, the core 32 may be dissolved by immersing the entire into the specific solvent. Further, the core 30 may be constructed of a pyrolytic material, and after the first cylinder 14 and the second cylinder 12 are formed, the core 30 may be pyrolyzed and vaporized by heating the entire. The configuration of each member and conditions in this manufacturing method such as the configuration of the core 30, are not particularly limited.

Although in the present embodiment, an example in which the laser tube 10 is manufactured by thermal spraying has been described, the laser tube 10 may be manufactured by techniques different than thermal spraying. For example, the laser tube 10 may be manufactured by wrapping a ceramic green sheet which contains yttrium-containing oxide such as yttria or YAG as a main component, on a surface of the core 30, wrapping thereon a ceramic green sheet which contains alumina as a main component, and then sintering the entire. Also, the laser tube 10 may be manufactured by repetitively applying and drying a slurry which contains powder of yttrium-containing oxide, on the surface of the core 30, repetitively applying and drying thereon a slurry which contains alumina powder, and then sintering the entire. For example, in a case where a pore-forming agent made of resin beads or the like is mixed in the green sheets or the slurries in such a manner that, for example, an amount of the pore-forming agent is partially adjusted, values of arithmetic averaged roughnesses (Ra) and surface open pore ratios of the inner surface 14A of the first cylinder 14 and the outer surface 12B of the second cylinder 12 can be changed. In the manufacturing method using green sheets or the manufacturing method using slurries, tremendous effort and cost are required to manufacture the green sheets, to apply and dry the slurries or the like. Additionally, in the manufacturing method using green sheets or the manufacturing method using slurries, for example, even if the pore-forming agent or the like is used, it is difficult to adjust distribution thereof and thus to change values of arithmetic averaged roughnesses (Ra) or surface open pore ratios of the inner surface 14A and the outer surface 12B. Contrarily, in the manufacturing method using thermal spraying as described above, the laser tube 10 can be manufactured at relatively low effort and cost, and also values of arithmetic averaged roughnesses (Ra) or surface open pore ratios of the inner surface 14A and the outer surface 12B can be relatively easily changed. Further, as described above, in a case where the laser tube 10 is manufactured by thermal spraying, the inside of the first cylinder 14 or the second cylinder 12 becomes a state where relatively many large gaps S are formed between micro-particles 14a or between micro-particles 12a, respectively, and thus deterioration thereof caused by thermal expansion due to generation of plasma can be advantageously inhibited.

Configurations or various conditions of the cylinder, the plasma apparatus, the gas laser apparatus and the method of manufacturing the cylinder as described above are not particularly limited. It will be apparent that various modifications and changes are possible without departing from the scope of the invention.

REFERENCE SIGNS LIST

5: Cathode
6: Anode
7: Enveloper
8: Reflecting mirror
10: Laser tube (cylinder)
11: Conduit
12: Second cylinder
14: First cylinder

The invention claimed is:

1. A cylinder, comprising:
a first cylinder having an inner surface exposed; and
a second cylinder joined to an outer surface of the first cylinder, the second cylinder containing alumina as a main component,
the first cylinder containing yttrium-containing oxide as a main component, and
wherein an arithmetic average roughness Ra of the inner surface of the first cylinder is smaller than an arithmetic average roughness Ra of an outer surface of the second cylinder.

2. The cylinder according to claim 1, wherein a surface open pore ratio of the inner surface of the first cylinder is smaller than a surface open pore ratio of an outer surface of the second cylinder.

3. The cylinder according to claim 1, wherein a thickness of the second cylinder is larger than a thickness of the first cylinder.

4. The cylinder according to claim 3, wherein the thickness of the first cylinder is 0.5 mm or more and 1 mm or less, and the thickness of the second cylinder is 2.6 mm or more and 3.6 mm or less.

5. The cylinder according to claim 1, wherein the first cylinder and the second cylinder are composed of a thermally-sprayed film.

6. A plasma apparatus, comprising:
the cylinder according to claim 1; and
electrodes disposed in an inner space of the cylinder.

7. A gas laser apparatus, comprising:
the plasma apparatus according to claim 6; and
a gas supply port which supplies a laser oscillation gas to the inner space of the cylinder constituting the plasma apparatus.

8. A method of manufacturing a cylinder, comprising:
preparing a rod-shaped core;
forming a first cylinder by thermally spraying yttrium-containing oxide onto an outer surface of the core;
forming a second cylinder by thermally spraying alumina onto an outer surface of the first cylinder, wherein an arithmetic average roughness Ra of the inner surface of the first cylinder is smaller than an arithmetic average roughness Ra of an outer surface of the second cylinder; and
removing the core from an assembly of the first cylinder and the second cylinder.

* * * * *